United States Patent
Avins et al.

(10) Patent No.: US 8,985,290 B2
(45) Date of Patent: Mar. 24, 2015

(54) SEALED PLATE FOR A CLUTCH AND METHOD THEREOF

(71) Applicant: Schaeffler Technologies AG & Co. KG, Herzogenaurach (DE)

(72) Inventors: David C. Avins, Burbank, CA (US); Gregory Weyer, Wooster, OH (US)

(73) Assignee: Schaeffler Technologies AG & Co. Kg, Herzogenaurach (DE)

( * ) Notice: Subject to any disclaimer, the term of this patent is extended or adjusted under 35 U.S.C. 154(b) by 0 days.

(21) Appl. No.: 14/039,765

(22) Filed: Sep. 27, 2013

(65) Prior Publication Data
US 2014/0090943 A1  Apr. 3, 2014

Related U.S. Application Data

(60) Provisional application No. 61/708,860, filed on Oct. 2, 2012.

(51) Int. Cl.
| | |
|---|---|
| *F16D 37/00* | (2006.01) |
| *F16D 13/58* | (2006.01) |
| *F16D 33/18* | (2006.01) |
| *F16D 13/64* | (2006.01) |
| *F16H 45/02* | (2006.01) |
| *F16D 25/0635* | (2006.01) |

(52) U.S. Cl.
CPC ............... *F16D 13/58* (2013.01); *F16D 33/18* (2013.01); *F16D 13/64* (2013.01); *F16H 45/02* (2013.01); *F16D 25/0635* (2013.01); *F16D 2300/08* (2013.01)
USPC ........................................................ 192/3.29

(58) Field of Classification Search
USPC .......... 192/3.29, 3.33, 3.31, 70.17, 200, 3.21, 192/3.28, 48.619, 85.44
See application file for complete search history.

(56) References Cited

U.S. PATENT DOCUMENTS

| | | | |
|---|---|---|---|
| 6,305,521 B1 * | 10/2001 | Hall et al. | 192/85.41 |
| 7,992,694 B2 * | 8/2011 | Krause et al. | 192/3.29 |
| 8,622,185 B2 * | 1/2014 | Metzinger et al. | 192/48.619 |
| 2008/0277228 A1 * | 11/2008 | George | 192/48.1 |
| 2011/0120829 A1 * | 5/2011 | Vanni et al. | 192/3.29 |
| 2012/0006642 A1 | 1/2012 | Greathouse et al. | |

* cited by examiner

*Primary Examiner* — Saul Rodriguez
*Assistant Examiner* — David J Hlavka
(74) *Attorney, Agent, or Firm* — Simpson & Simpson, PLLC (57) ABSTRACT

A clutch for a torque converter, including: a piston axially displaceable to open and close the clutch; and a seal plate engaged with the piston and including: a main portion radially located between inner and outer circumferences of the seal plate and having a first thickness in an axial direction; and a seal retaining portion extending radially inward or outward from the main portion and including: first and second walls extending axially beyond the main portion; a weld fixedly connecting the first wall to the main portion; and a slot at least partially formed by the first and second walls and opening radially inward or radially outward. The slot is arranged to accept a seal element. The seal element is arranged to seal the seal plate to a cover for a torque converter or to a component fixedly secured to a cover for a torque converter.

12 Claims, 9 Drawing Sheets

PRIOR ART

SEALED PLATE FOR A CLUTCH AND METHOD THEREOF

CROSS-REFERENCE TO RELATED APPLICATIONS

This application claims the benefit under 35 U.S.C. §119 (e) of U.S. Provisional Patent Application No. 61/708,860 filed Oct. 2, 2012, which application is incorporated herein in its entirety.

TECHNICAL FIELD

The present disclosure relates to a sealed plate for a clutch, in particular, a sealed plate for a lock-up clutch in a torque converter arranged to hydraulically isolate a release chamber for the clutch. Even more particularly, a seal plate having a thickened circumference in which a slot for retaining a seal is formed.

BACKGROUND

It is known to use apply and release chambers in a torque converter to control a lock-up clutch. For example, fluid pressure in the apply chamber is increased with respect to fluid pressure in the release chamber to close the clutch and, conversely, fluid pressure in the release chamber is increased with respect to fluid pressure in the apply chamber to open the clutch.

In some applications, it is desirable to keep the clutch engaged when the torque converter is in coast mode, that is, a transmission for a vehicle housing the torque converter is applying torque to an engine for the vehicle. To accomplish this, fluid pressure in the apply chamber must be kept higher than fluid pressure in the release chamber. However, due to the fluid currents generated by the coast mode and the fluid communication between the release and apply chambers noted above, fluid flows from the apply chamber to the release chamber. This fluid flow may result in the fluid pressure in the release chamber being greater than the fluid pressure in the apply chamber, which prevents the clutch from closing.

Figure 5:
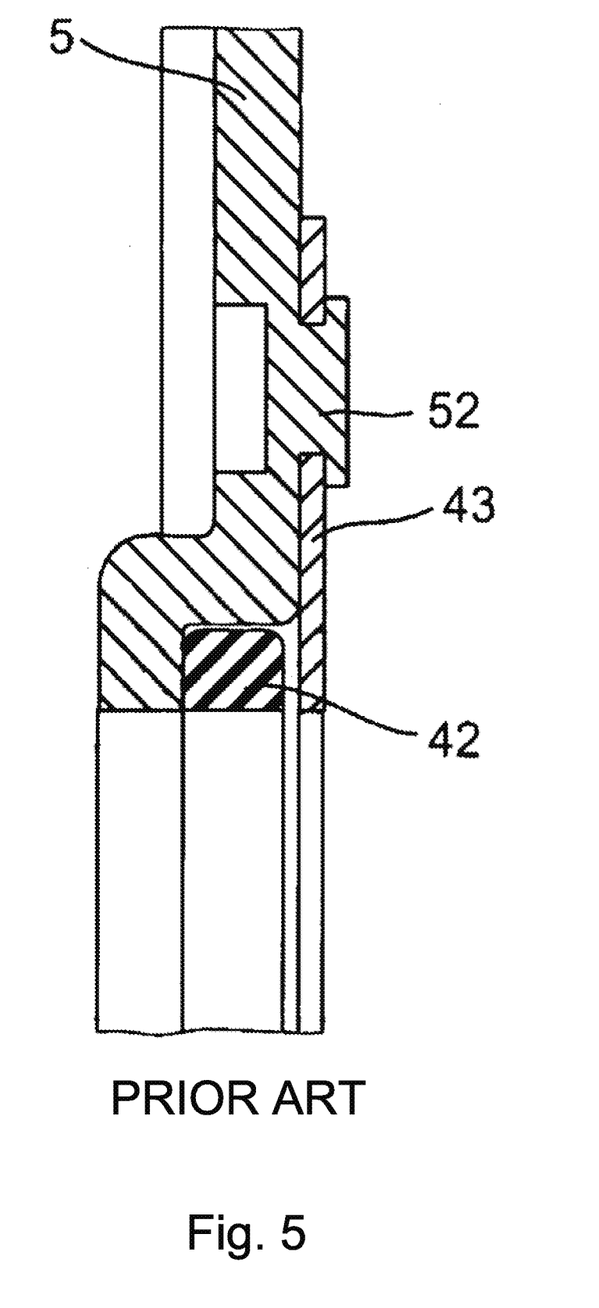

FIG. 5 is a partial cross-sectional view of a prior art seal arrangement to isolate apply and release chambers for a clutch. Commonly owned U.S. Patent Application Publication No. 2008/0277228 uses retainer 43 connected to cover 5 with rivets 52 to retain seal 42, as shown in FIG. 5. However, this arrangement requires fabricating rivets from the cover and increases the axial extent of the clutch, since the retainer is offset from the seal in the axial direction.

SUMMARY

According to aspects illustrated herein, there is provided a torque converter, including: a cover arranged to receive torque; a pump shell nonrotationally connected to the cover; a turbine shell; and a clutch including: a piston axially displaceable to open and close the clutch; and a seal plate engaged with the piston. The seal plate includes: a main portion radially located between inner and outer circumferences of the seal plate and having a first thickness in an axial direction; and a seal retaining portion extending radially inward or outward from the main portion and including: first and second walls extending axially beyond the main portion, the first and second walls including respective outside surfaces facing the cover and the turbine shell, respectively; and a slot at least partially formed by the first and second walls and opening radially inward or radially outward. The torque converter includes a seal element at least partially disposed in the slot and sealing the seal plate to the cover or to a component fixedly secured to the cover; an apply pressure chamber at least partially formed by the piston and the seal element; and a release pressure chamber at least partially formed by the piston and the seal element. An axial distance between the respective outside surfaces is substantially equal to twice the first thickness. Increasing fluid pressure in the apply pressure chamber to be greater than fluid pressure in the release chamber displaces the piston to close the clutch.

According to aspects illustrated herein, there is provided a clutch for a torque converter, including: a piston axially displaceable to open and close the clutch; and a seal plate engaged with the piston and including: a main portion radially located between inner and outer circumferences of the seal plate and having a first thickness in an axial direction; and a seal retaining portion extending radially inward or outward from the main portion and including: first and second walls extending axially beyond the main portion; a weld fixedly connecting the first wall to the main portion; and a slot at least partially formed by the first and second walls and opening radially inward or radially outward. The slot is arranged to accept a seal element. The seal element is arranged to seal the seal plate to a cover for a torque converter or to a component fixedly secured to a cover for a torque converter.

According to aspects illustrated herein, there is provided a method of fabricating a seal plate for a clutch, including forming an annular-shaped piece of material having first and second surfaces facing in opposite axial directions, a substantially uniform thickness in the axial directions, a central portion, a radially inner portion continuous with the central portion and including a radially inner circumference for the piece of material, and a radially outer portion continuous with the central portion and including a radially outer circumference for the piece of material. The method includes bending a distal segment of the radially inner or outer portion such that the distal segment is axially aligned with a connector portion of the radially inner or outer portion continuous with the central portion; welding the distal segment to the seal plate, and removing material from the distal and connector segments to form a slot facing radially inward or outward.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1A:
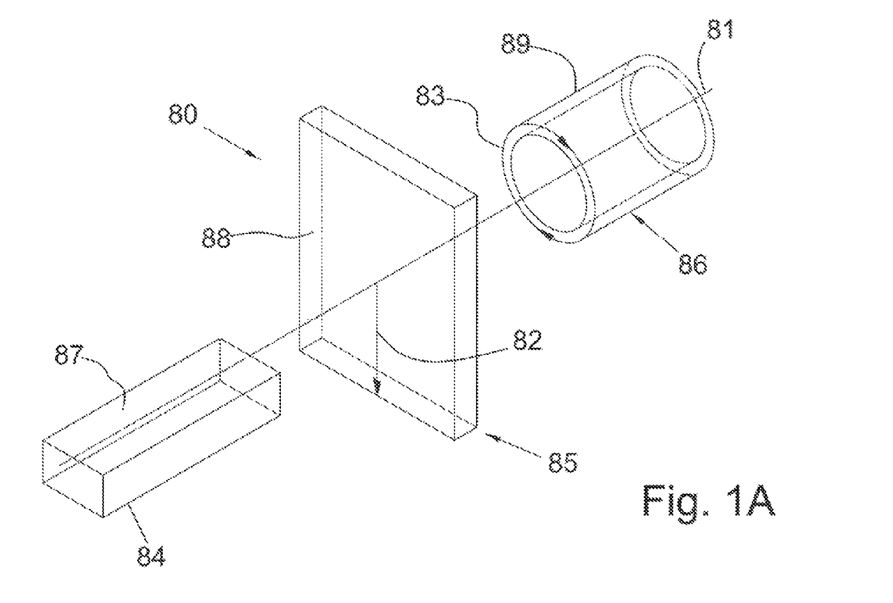
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
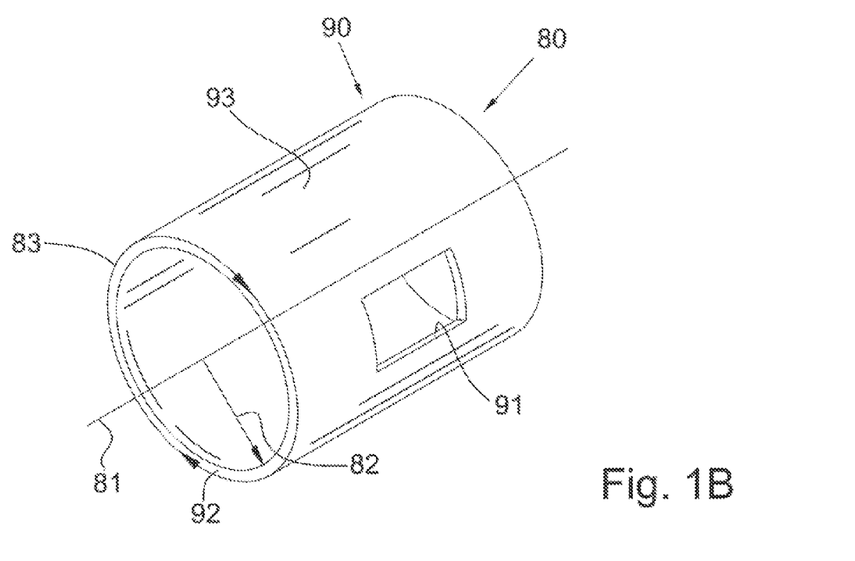
FIG. 1B is a perspective view of an object in the cylindrical coordinate system of FIG. 1A demonstrating spatial terminology used in the present application; and, FIG. 2 is a partial cross-sectional view of a seal plate for a clutch.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

Figure 2:
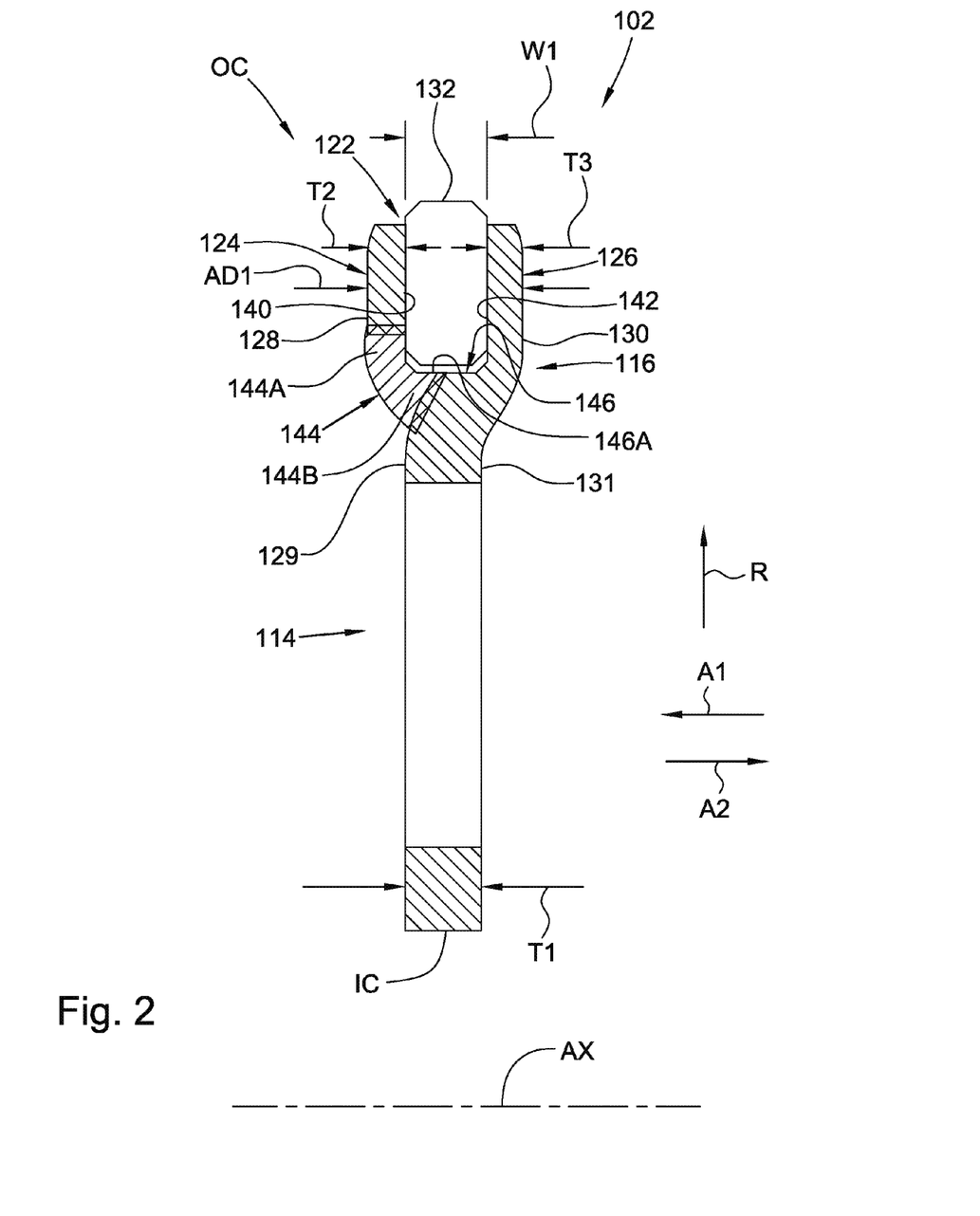

FIG. 2 is a partial cross-sectional view of a seal plate for a clutch.

Figure 3:
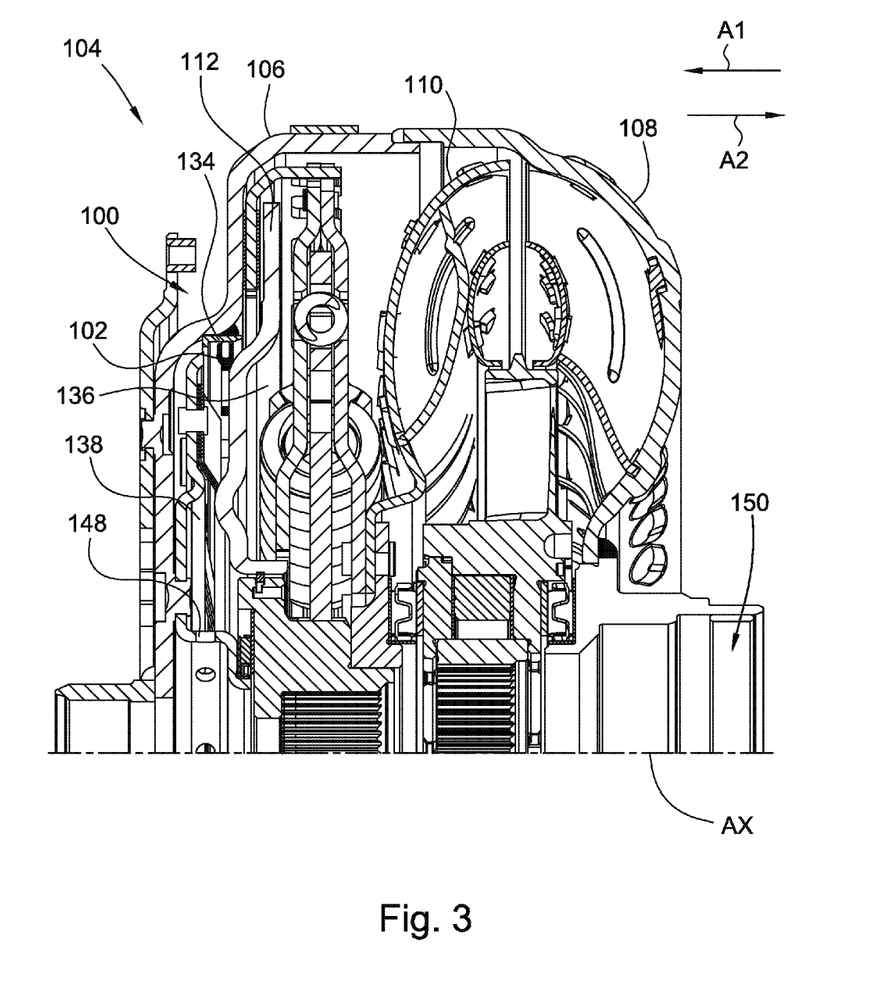
FIG. 3 is a partial cross-sectional view of a clutch with the seal plate of FIG. 2 in a torque converter.

FIG. 3 is a partial cross-sectional view of clutch 100 with seal plate 102 of FIG. 2 in torque converter 104.

The following should be viewed in light of FIGS. 2 and 3. The torque converter includes cover 106 arranged to receive torque, pump shell 108 nonrotationally connected to the cover, and turbine shell 110. The clutch includes piston 112 axially displaceable, for example, in axial directions A1 and A2 to displace seal plate 102 and close and open, respectively, the clutch. The seal plate is engaged with the piston, for example, the seal plate is secured to the piston such that axial displacement of the piston results in a similar axial displacement of the seal plate.

The seal plate includes main portion 114 and seal retaining portion 116. Portion 114 has thickness T1 in direction A1 and is radially located between inner and outer circumferences IC and OC, respectively, of the seal plate. The seal retaining portion can be located at a portion of the plate continuous with portion 114 and include OC or IC. Thus, the seal retaining portion extends radially outward from the main portion or extends radially inward from the main portion. The discussion that follows is directed to the seal retaining portion being continuous with portion 114 and including OC; however, it should be understood that the discussion is applicable to the seal retaining portion being continuous with portion 114 and including IC.

Portion 116 includes slot 122 and walls 124 and 126 extending axially beyond the main portion. That is, outside surfaces 128 and 130 of walls 124 and 126, respectively, are offset in axial directions A1 and A2, respectively, from surfaces 129 and 131. Stated otherwise, surfaces 128 and 129 and surfaces 130 and 131 are misaligned in radial direction R. The slot is at least partially formed by walls 124 and 126 and opens radially outward. Other embodiments (not shown) where portion 114 includes IC, for example, may include a slot that opens radially inward.

The clutch also includes seal element 132 engaged with the seal plate and sealing the seal plate to the cover or to a component fixedly secured to the cover, for example, plate 134 welded to the cover. The seal element is at least partially disposed in the slot and is retained by the slot. The torque converter includes apply pressure chamber 136 at least partially formed by the piston and the seal element and release pressure chamber 138 at least partially formed by the piston and the seal element. Increasing fluid pressure in the apply pressure chamber to be greater than fluid pressure in the release chamber displaces the piston to close the clutch. Conversely, increasing fluid pressure in the release pressure chamber to be greater than fluid pressure in the apply chamber displaces the piston to open the clutch.

In an example embodiment, width W1 of the slot in direction A1 or A2 is substantially equal to T1. Walls 124 and 126 include slot surfaces 140 and 142, respectively, forming respective radially disposed boundaries of the slot. In an example embodiment, axial distance AD1 between the respective outside surfaces is substantially equal to twice T1. In an example embodiment, axial thickness T2 or T3 for wall 124 or 126, respectively, is substantially equal to one half T1.

The seal plate includes weld 144 fixedly connecting one of walls 124 or 126 to the remainder of the seal plate. The discussion that follows is directed to weld 144 and wall 124; however, it should be understood that the discussion is applicable to weld 144 and wall 126 as well. In an example embodiment, portion 144A of the weld is radially aligned with wall 124 and portion 144B of the weld is radially aligned with the main portion. Stated otherwise, portion 144A is radially misaligned with the main portion. In an example embodiment, the weld forms at least segment 146A of radially inner boundary 146 of the slot.

In an example embodiment, the release chamber is sealed, in particular, with respect to the apply chamber, except for channel 148 for supplying fluid to and draining fluid from the release chamber. Channel 148 is in fluid communication with a fluid pump via a transmission input shaft in cavity 150.

Figure 4A:
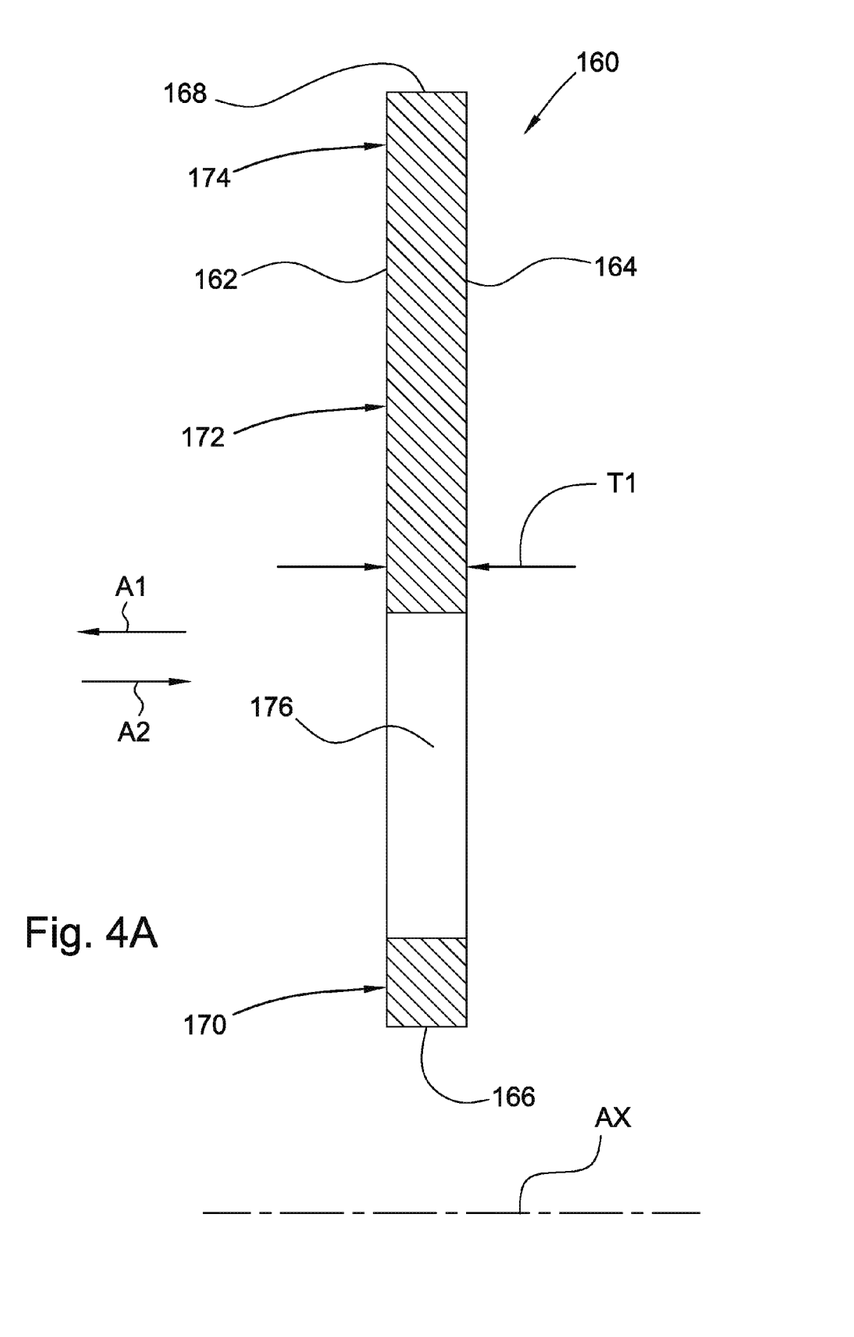
FIGS. 4A through 4E illustrate example fabrication of a seal plate for a clutch; and, FIG. 5 is a partial cross-sectional view of a prior art seal arrangement for a clutch.

FIGS. 4A through 4E illustrate example fabrication of seal plate 102 for a clutch. FIG. 4A is a partial cross-section of a piece of material, or blank 160 used to form seal plate 102. The discussion below is directed to an example embodiment in which operations are performed on a radially outermost portion of the blank to form a slot facing radially outward; however, it should be understood that the discussion is applicable to an example embodiment in which operations are performed on a radially innermost portion of the blank to form a slot facing radially inward.

As shown in FIG. 4A, to initiate fabrication, blank 160 is formed in a ring-shape with axis AX, surfaces 162 and 164 facing in opposite axial directions A1 and A2, respectively, and inner and outer circumferences 166 and 168. The blank also is formed to have substantially uniform thickness T1 in direction A1 or A2. The blank is further formed to include: radially inner portion 170 continuous with central portion 172 and including inner circumference 166; and radially outer portion 174 continuous with the central portion and including outer circumference 168. Central portion 172 is radially disposed between the inner and outer portions. The exact respective radial extents of portions 170, 172, and 174 are variable and can be set according to the requirements of a particular application. In an example embodiment, at least one opening 176 is formed in the blank according to the requirements for a particular clutch application.

Figure 4B:
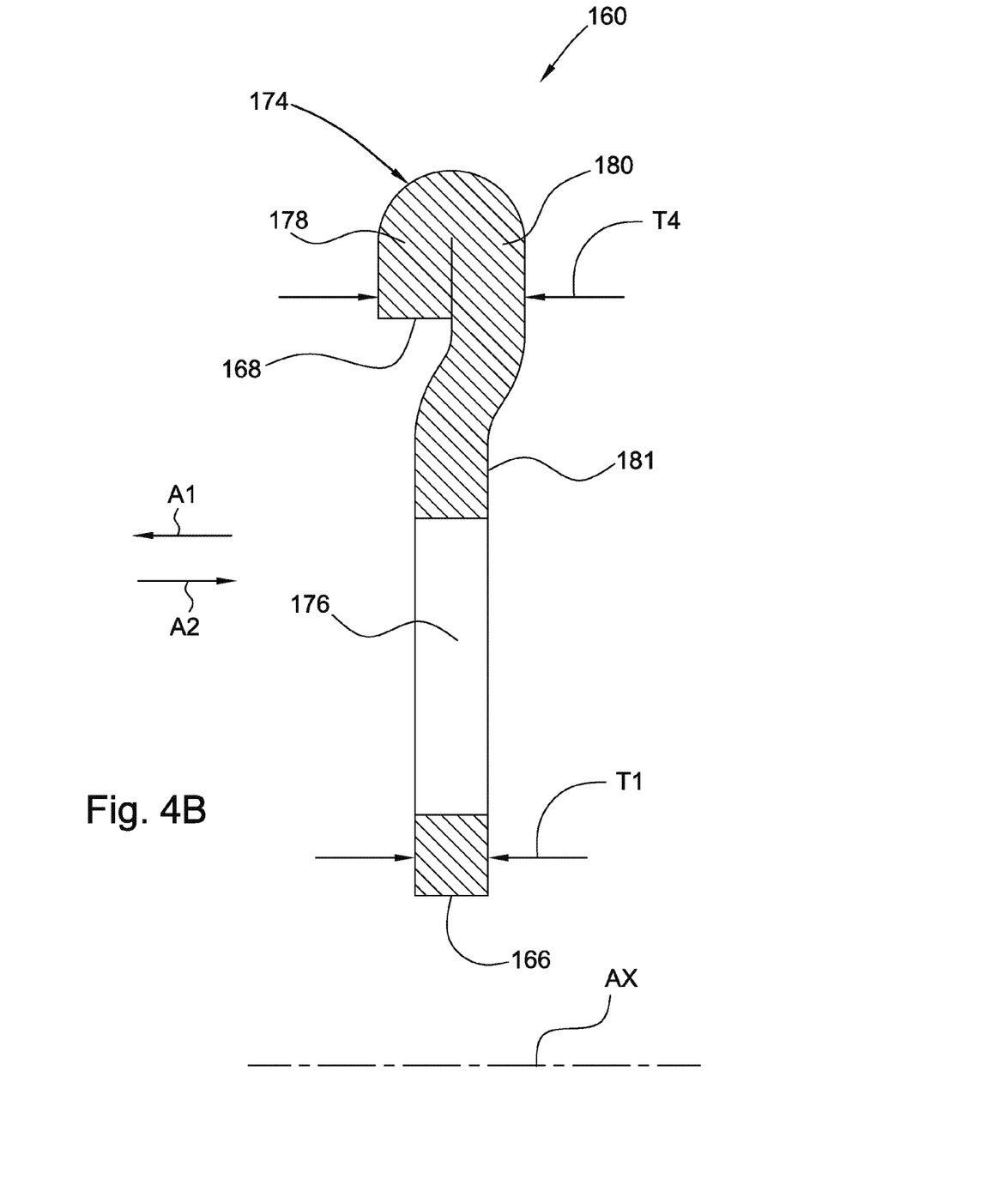

In FIG. 4B, distal segment 178 of portion 174 has been rolled, or bent, such that the distal segment is axially aligned with connector portion 180 of outer portion 174 continuous with the central portion. That is, portion 174 has been doubled back upon itself so that the outer circumference is axially aligned with portion 180. Thus, an axial step is formed in portion 174 such that the interface of portions 178 and 180 is approximately aligned with the middle of remaining portion 181. Thus, thickness T4 is approximately double thickness T1.

Figure 4C:
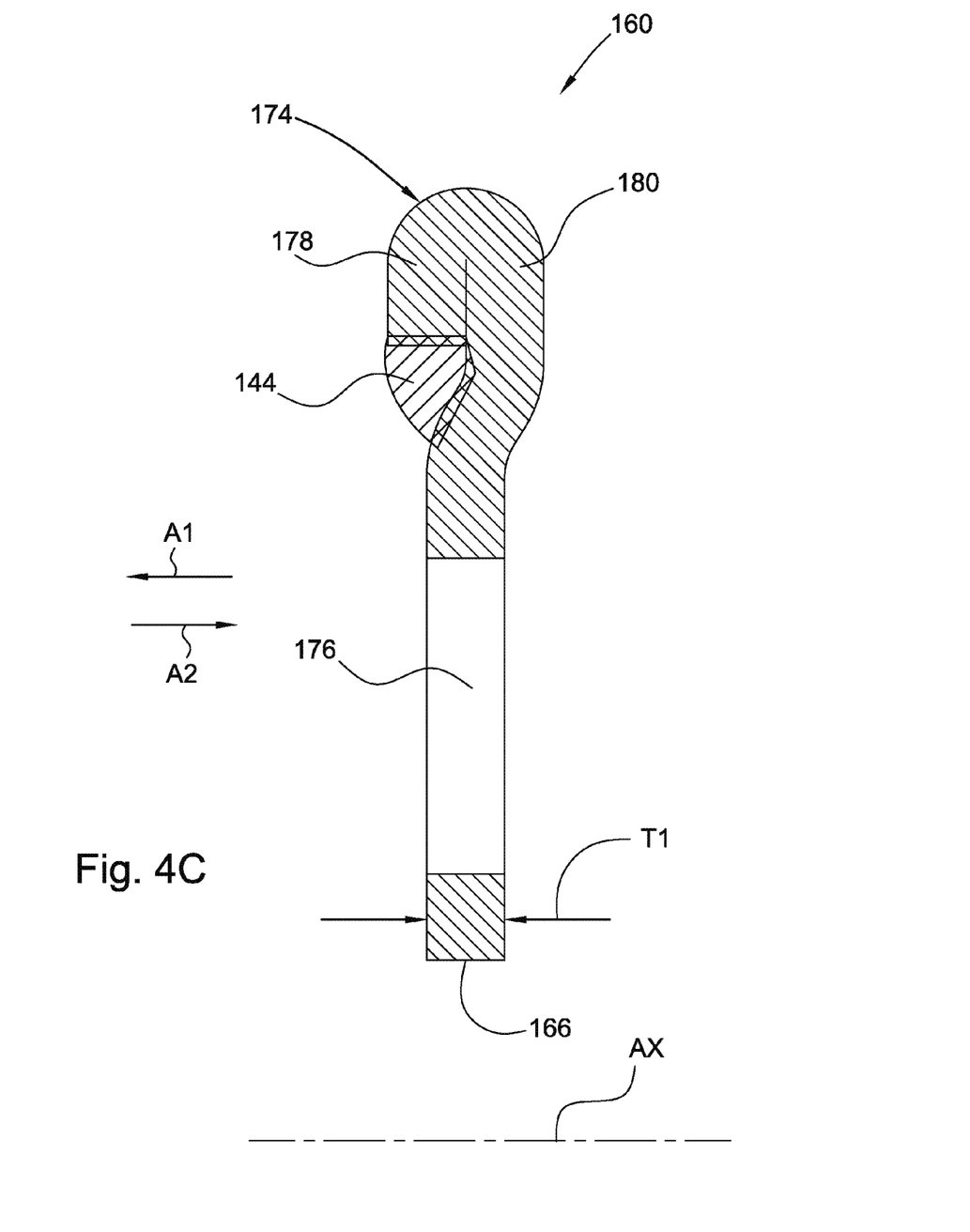

In FIG. 4C, distal segment 178 is welded to the seal plate, for example to segment 180, forming weld 144.

Figure 4D:
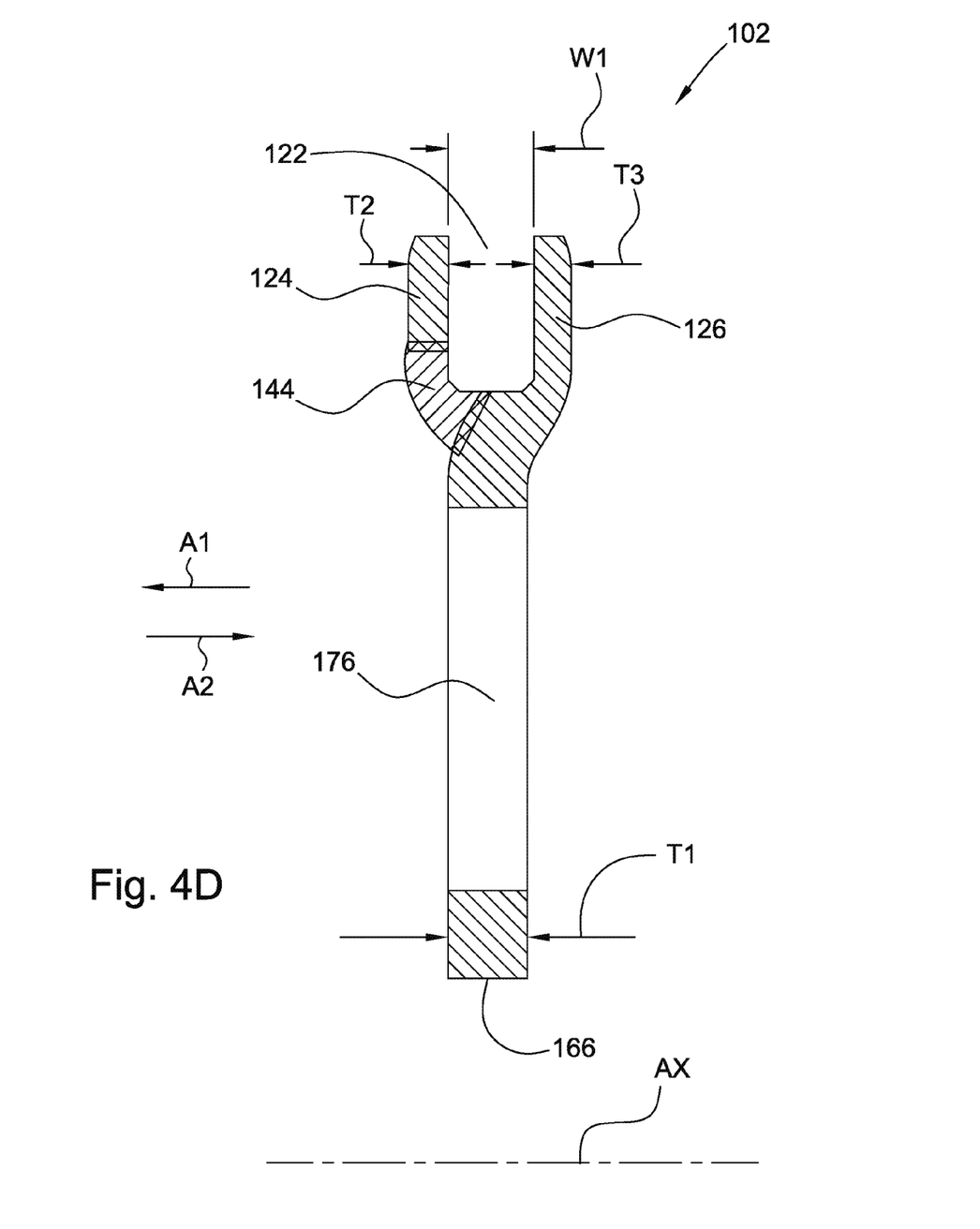

In FIG. 4D, material from the blank, in particular, the distal and connector segments, is removed to form slot 122, facing radially outward, and walls 124 and 126. In an example embodiment, axial width W1 of the slot is substantially equal to thickness T1. In an example embodiment, one or both axial thickness T2 and T3 of walls 124 and 126, respectively, are substantially equal to one half thickness T1. In FIG. 3D, blank 160 is substantially configured as seal plate 102. Walls 124 and 126 form respective radially aligned boundaries of the slot. In an example embodiment, portions of weld 144 are removed to form the slot.

Figure 4E:
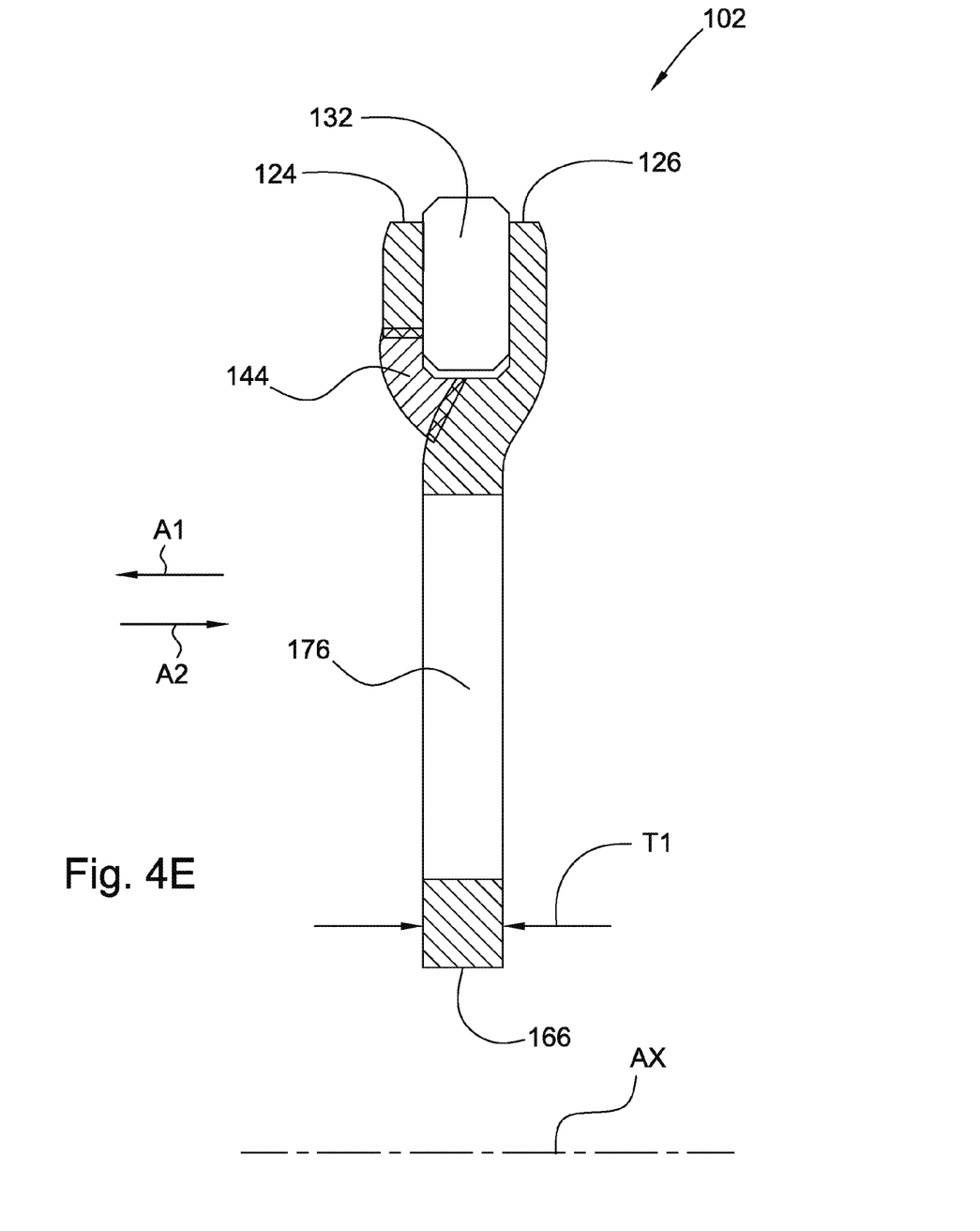

In FIG. 4E, seal 132 has been placed in slot 122.

Advantageously, seal plate 102 provides a desired seal between release and apply chambers for a clutch, for example, clutch 100 in torque converter 104. Also, seal plate 102 advantageously is not offset in an axial direction from a seal element, such as seal element 132, thus minimizing the axial extent of a clutch, such as clutch 100 including the seal plate. At the same time, seal plate 102 provides a more robust seal plate with a thickness about equal to that of a seal element used with the seal plate. Further, seal plate 102 is fabricated using simple stamping, rolling/folding, welding, and machining (forming slot 122) processes, which reduce overall cost and complexity for producing a clutch using seal plate 102.

In addition, in some configurations, further fabricating steps on other parts of a clutch or torque converter to implement the seal between the release and apply chambers can be eliminated (in the case in which seal element directly contacts the cover) or reduced. For example, the arrangement of FIG. 5 requires forming rivets in a cover, placing a retainer plate over the rivets and smashing the rivets to secure the retainer plate.

Thus, seal plate 102 also provides advantageous modularity, for example, with seal plate 102, a clutch such as clutch 100 is a "stand alone" unit that can be inserted as a unit into another device, such as torque converter 104. That is, operations required on parts of the device, such as cover 106, to accommodate a clutch with seal plate 102 can be minimized or reduced (in the case in which seal element directly contacts the cover). In contrast, the arrangement of FIG. 5 is not modular and requires forming rivets 52, stacking seal 42 and retainer 43, and then smashing the rivets to fix the retainer.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What we claim is:

1. A torque converter, comprising:
a cover arranged to receive torque;
a pump shell nonrotationally connected to the cover;
a turbine shell;
a clutch including:
  a piston axially displaceable to open and close the clutch;
  a seal plate engaged with the piston and including:
    a main portion radially located between inner and outer circumferences of the seal plate and having a first thickness in an axial direction; and,
    a seal retaining portion extending radially outward from the main portion and including:
      first and second walls extending axially beyond the main portion, the first and second walls including respective outside surfaces facing the cover and the turbine shell, respectively; and,
      a slot at least partially formed by the first and second walls and opening radially outward; and,
    a seal element at least partially disposed in the slot and sealing the seal plate to a component fixedly secured to the cover;
an apply pressure chamber at least partially formed by the piston and the seal element; and,
a release pressure chamber at least partially formed by the piston and the seal element, wherein:
  an axial distance between the respective outside surfaces is equal to twice the first thickness; and,
  increasing fluid pressure in the apply pressure chamber to be greater than fluid pressure in the release chamber displaces the piston to close the clutch.

2. The torque converter of claim 1, wherein a second axial thickness for the first wall is equal to one half the first thickness.

3. The torque converter of claim 1, wherein:
the seal plate includes a weld fixedly connecting the first wall to the main portion; and,
a first portion of the weld is radially misaligned with the main portion and a second portion of the weld is radially aligned with the main portion.

4. The torque converter of claim 1, wherein:
the seal plate includes a weld fixedly connecting the first wall to the radially outer end of the main portion; and,
the weld defines at least a segment of:
a radially inner boundary of the slot.

5. A clutch for a torque converter, comprising:
a piston axially displaceable to open and close the clutch; and,
a seal plate engaged with the piston and including:
  a main portion radially located between inner and outer circumferences of the seal plate and having a first thickness in an axial direction; and, a seal retaining portion extending radially outward from the main portion and including:
- first and second walls extending axially beyond the main portion;
- a weld fixedly connecting the first wall to the main portion; and,
- a slot at least partially formed by the first and second walls and opening radially outward, wherein:
  - the slot is arranged to accept a seal element; and,
  - the seal element is arranged to seal the seal plate to a cover for a torque converter.

6. The clutch of claim 5, wherein:
the first and second walls include respective outside surfaces facing away from the slot; and,
an axial distance between the respective outside surfaces is equal to twice the first thickness.

7. The clutch of claim 5, wherein a second axial thickness for the second wall is equal to one half the first thickness.

8. The clutch of claim 5, wherein a first portion of the weld is radially misaligned with the main portion and a second portion of the weld is radially aligned with the main portion.

9. The clutch of claim 5, wherein a first portion of the weld is radially aligned with the first wall and a second portion of the weld is radially aligned with the main portion.

10. The clutch of claim 5, wherein the weld defines at least a segment of:
a radially inner boundary of the slot.

11. The torque converter of claim 1, wherein:
the seal plate includes a weld fixedly connecting the first wall to the radially outer end of the main portion; and,
the weld defines at least a segment of a radially aligned boundary of the slot.

12. The clutch of claim 5, wherein the weld defines at least a segment of a radially aligned boundary of the slot.

* * * * *